United States Patent [19]
Peters

[11] 4,063,933
[45] Dec. 20, 1977

[54] PROCESS FOR THE TREATMENT OF COMPLEX LEAD-ZINC CONCENTRATES

[75] Inventor: Ernest Peters, Vancouver, Canada

[73] Assignee: Texasgulf Canada Ltd., Toronto, Canada

[21] Appl. No.: 746,345

[22] Filed: Dec. 1, 1976

[30] Foreign Application Priority Data

July 2, 1976 Canada .................................. 256145

[51] Int. Cl.$^2$ ........................................... C22B 13/04
[52] U.S. Cl. .................... 75/101 R; 75/104; 75/115; 75/117; 75/118 R; 75/120; 204/117; 204/119
[58] Field of Search ..................... 75/101 R, 115, 117, 75/118 R, 120, 104; 204/117, 119

[56] References Cited
U.S. PATENT DOCUMENTS

| | | | |
|---|---|---|---|
| 1,154,602 | 9/1915 | Best | 75/120 X |
| 1,539,713 | 5/1925 | Christensen | 75/120 X |
| 1,572,268 | 2/1926 | Christensen | 75/120 |
| 1,886,162 | 11/1932 | Christensen | 75/120 X |
| 2,655,472 | 10/1953 | Hilliard et al. | 204/119 X |
| 2,927,017 | 3/1960 | Marvin | 75/105 |
| 3,316,059 | 4/1967 | Vizsolyi et al. | 75/120 X |
| 3,477,927 | 11/1969 | Veltman et al. | 204/119 X |
| 3,967,107 | 7/1976 | Lippert et al. | 75/101 R |

Primary Examiner—G. Ozaki

[57] ABSTRACT

Sulfide concentrates containing metals such as lead, zinc, copper and silver are treated to selectively recover these metals in high yields in a process wherein the concentrate is sequentially leached or extracted with sulfuric acid in the presence of oxygen; lime in the presence of sulfide ion; and ferric chloride. The leach solutions resulting from each extraction may then be treated to recover metals in their elemental state. The process does not produce sulfur oxides.

14 Claims, 1 Drawing Figure

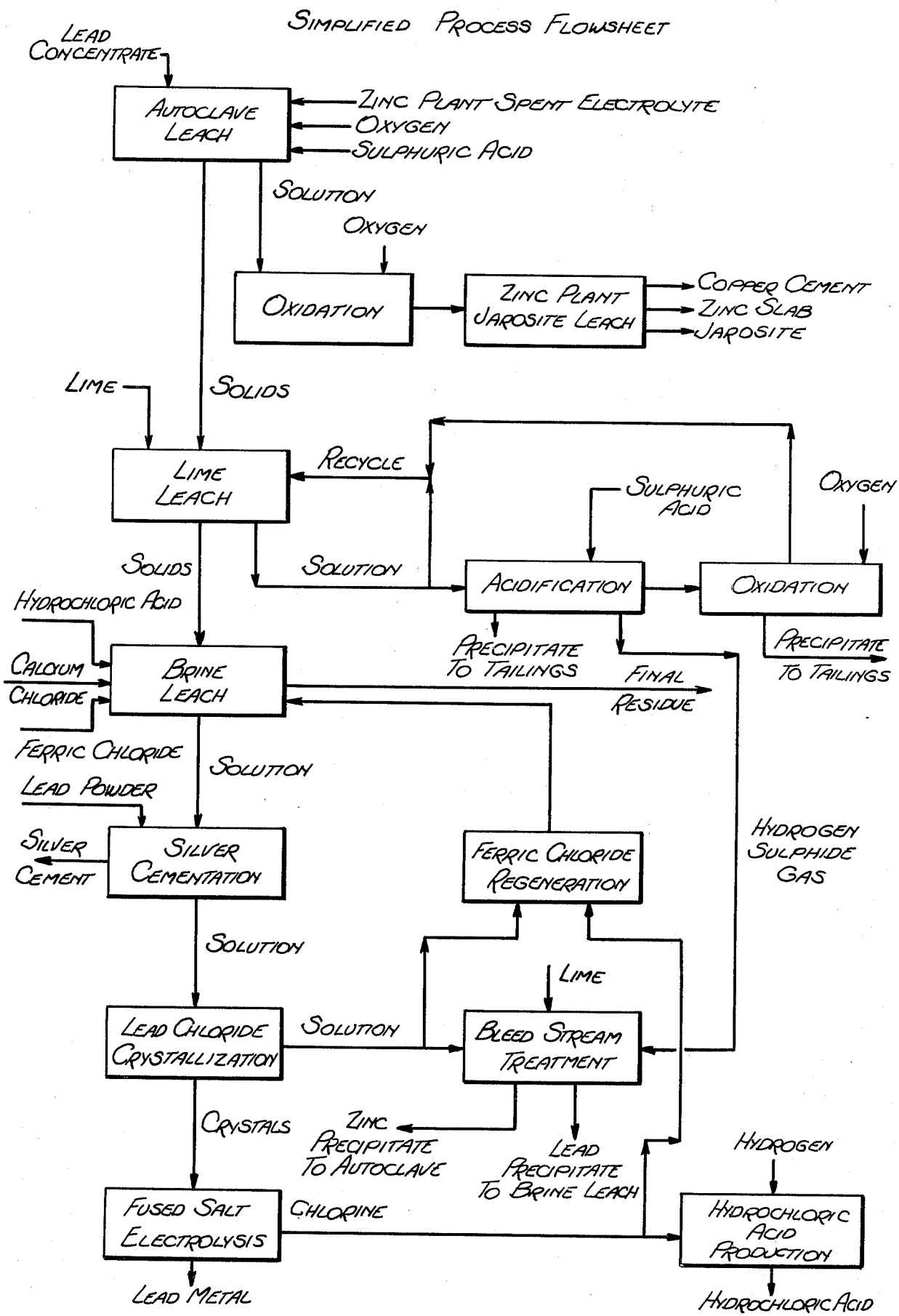

PROCESS FOR THE TREATMENT OF COMPLEX LEAD-ZINC CONCENTRATES

FIELD OF THE INVENTION

This invention relates to metallurgy, and more particularly, to the selective recovery of metals such as lead, copper, zinc and silver by hydrometallurgical techniques.

BACKGROUND OF THE INVENTION

Pyrometallurgical processes for recovering metals such as lead from ore deposits are well-known in the art and used extensively throughout the industry. However, since the lead in such ores exists primarily in combination with sulfur or sulfur-bearing materials, pyrometallurgy leads to the oxidation of these sulfur materials and the formation of sulfur oxides.

Air pollution regulations and standards, promulgated by both federal and state agencies in recent years, have placed severe restrictions on permissible sulfur oxide emission levels from such processes. While the industry has developed numerous methods for recovering sulfur oxides emitted from pyrometallurgical processes, such techniques are highly expensive. Indeed, the anticipated advent of yet more stringent pollution standards may impose technologically impossible, as well as economically unfeasible, demands on the industry.

Hydrometallurgical techniques for recovering metals, however, offer an attractive alternative emission control approach since they do not result in the formation of sulfur oxides. Rather, hydrometallurgy permits the recover of sulfur in its elemental form. Despite this seemingly simple solution to the emission problem, however, hydrometallurgy is economically competitive with pyrometallurgical processing only if near complete recovery of the desired metal from the ore is effected, a condition difficult to achieve on a commercial scale utilizing current hydrometallurgical techniques. To offset these costs it is further desired to effect complete recovery of all other metals present within the ore.

The foregoing problems are particularly pronounced where the desired metal exists in a low grade deposit since the costs per unit of metal produced are extremely high. In particular, low-grade lead concentrates containing copper, zinc and silver cannot be economically processed unless a near complete recovery of all these metals is obtained. Heretofore, hydrometallurgy has not been successful in selectively recovering the variety of metals contained in such concentrates.

It is accordingly an object of this invention to selectively recover, in high yields, a number of valuable metals from ores containing such metals.

A further object of this invention is to accomplish the foregoing recovery utilizing hydrometallurgical techniques.

A more specific object of this invention is to selectively recover lead, copper, zinc and silver from low grade concentrates containing such metals.

These and other objects will become more apparent upon reading the more detailed description which follows.

DESCRIPTION OF THE DRAWING

The drawing is a block diagram depicting the preferred embodiment of the process of the present invention.

SUMMARY OF THE INVENTION

In accordance with this invention, lead concentrates are treated to selectively recover high yields of lead, copper, zinc and silver therefrom by a process comprising leaching the concentrate with sulfuric acid in the presence of oxygen, leaching the residue therefrom with lime, and leaching the remaining residue with ferric chloride.

The present invention describes a process for treating sulfide concentrates containing lead, copper, zinc and silver to selectively recover said metals therefrom, comprising the steps of: (a) contacting said concentrate with sulfuric acid in the presence of oxygen at elevated temperature and pressure to extract copper and zinc materials from said concentrate; (b) thereafter contacting said concentrate with lime to remove elemental sulfur therefrom; and (c) thereafter by contacting said concentrate with a mixture of calcium chloride and ferric chloride to extract lead and silver materials therefrom.

In particular, the present invention is directed to a process for treating sulfide concentrates containing lead, copper, zinc and silver to selectively recover said metals therefrom, comprising the steps of: (a) contacting said concentrate with sulfuric acid in the presence of oxygen at a pressure of about 60 to 80 psig and a temperature of at least about 100° C; (b) dividing the concentrate treated in (a) into a first residue fraction and a first supernatant fraction; (c) treating said first supernatant fraction to recover metallic copper and zinc therefrom; (d) contacting said first residue fraction with lime at a temperature of about 95° C; (e) dividing the material resulting from (d) into a second residue fraction and a second supernatant fraction; (f) treating said second supernatant fraction to recover elemental sulfur therefrom; (g) contacting said second residue fraction with a mixture of ferric chloride and calcium chloride and removing a third supernatant fraction from the material resulting from said contacting; and (h) treating said third supernatant to recover metallic lead and silver therefrom.

DESCRIPTION OF THE PREFERRED EMBODIMENT

In the initial leaching step, hereinafter referred to as "oxygen leaching," the lead concentrate is contacted with sulfuric acid in the presence of oxygen. In this manner, copper and zinc are extracted from the concentrate as sulfates, lead sulfide is converted to lead sulfate, and a portion of the sulfur converted to the elemental state. In a preferred embodiment of this invention, chloride ion is also present to aid copper dissolution.

The oxygen leach is preferably conducted under elevated temperature and pressure. Preferred conditions in this respect are temperatures above about 100° C and pressures in the range of about 60-80 psig. The temperature is preferably maintained below the melting point of sulfur to prevent molten sulfur from coating the mineral particles. The time or extent of the oxygen leach will necessarily vary depending upon the pressure, concentration of reactants and metals, and other like factors. The requisite time period should be sufficient to effect complete dissolution of zinc and copper, yet not so long as to result in overleaching of iron.

As a result of the oxygen leach, there remains a residue of the so-treated concentrate and a solution containing the extracted zinc and copper compounds. This solution is then treated, as described hereinafter, to isolate and remove metallic copper and zinc.

The residue from the oxygen leach is then contacted with lime. This lime leach results in the removal of elemental sulfur and is attended by the reconversion of lead sulfate to lead sulfides. This leach is preferably conducted in the presence of added sulfide materials. As will be described in more detail hereinafter, critical conditions are believed to exist for both the quantity of lime employed in the lime leach, and the temperature at which the leach is conducted. The primary purpose of this leach is to enhance the subsequent extraction and recovery of silver. Reconversion of lead sulfate to lead sulfide in the lime leach is very important to the process reagent balance. Reconversion allows chlorine produced during lead chloride electrolysis to be recycled to the leach as ferric chloride produced in the oxidation stage.

The residue remaining from the lime leach is then further treated to remove silver and lead while the solution resulting from the lime leach is treated to remove sulfur. The former recovery involves contacting the residue with ferric chloride and calcium chloride at a reduced pH. By virtue of this leach, lead and silver are dissolved and further processed to selectively recover the metallic forms thereof.

As may be seen from the diagrammatic flow-sheet, a sulfide concentrate containing, inter alia, lead, copper, zinc and silver is admitted to an appropriate autoclave apparatus designed to withstand pressures of at least 100 psig. The concentrate is contacted with sulfuric acid and the pressure within the autoclave brought to between about 60-80 psig with oxygen. The temperature in the autoclave is maintained at greater than 100° C and the leaching is conducted for two hours.

It is preferred to include chloride ion in the autoclave from an appropriate source to aid the dissolution of copper and to prevent silver solubilizing as a sulfate. Generally, a concentration of from about 100–200 parts per million chloride is utilized based upon the solids weight in the concentrate.

In this oxygen leach, the following principal reactions are believed to occur:

$$CuFeS_2 + 2H_2SO_4 + O_2 \rightarrow CuSO_4 + FeSO_4 + 2S° + 2H_2O$$

$$ZnS + H_2SO_4 + \tfrac{1}{2}O_2 \rightarrow ZnSO_4 + S° + H_2O$$

$$PbS + H_2SO_4 + \tfrac{1}{2}O_2 \rightarrow PbSO_4 + S° + H_2O$$

$$2FeSO_4 + H_2SO_4 + \tfrac{1}{2}O_2 \rightarrow Fe_2(SO_4)_3 + H_2O$$

Thus, zinc and copper are extracted from the concentrate as sulfates while a portion of the sulfur present is converted to elemental form.

The leach solution removed from the autoclave is then processed to remove copper and zinc, as well as other metals such as iron or cadmium. Iron may be removed as either jarosite, goethite or hematite. Copper is cemented with finely divided zinc metal and zinc recovered by electrolysis.

The sulfuric acid utilized in the oxygen leach may be provided, in whole or part from spent zinc electrolyte solution resulting from the electrolytic recovery of zinc metals from zinc sulfate, sulfuric acid being regenerated by the anode reaction. Such zinc spent electrolyte typically has a concentration of from 100–200 grams/liter of sulfuric acid.

The oxygen leach residue, containing lead sulfate and elemental sulfur, is next leached with lime and material capable of providing sulfide ion such as polysulfides. While it is possible to forego this treatment and pass the residue from the oxygen leach directly to the chloride leach, described in more detail hereinafter, to remove silver and lead, it has been determined that silver recoveries may be enhanced by first extracting the oxygen leach residue with lime to remove elemental sulfur therefrom. This lime leach additionally results in the reconversion of lead sulfate to lead sulfide. It has been determined that at least a ten percent excess of lime over the stoichiometrically required amount is needed to effect the conversion of lead sulfate and the leaching of sulfur. Sulfide ion is preferably provided as leach solution recycled before acidification to remove sulfur, as described hereinafter. Alternatively, hydrogen sulfide may be added to the lime leach solution. Since the conversion of lead sulfate to lead sulfide consumes polysulfides sufficient polysulfide to convert about ten percent of lead sulfate to lead sulfide is generally required.

The temperature at which the lime leach is conducted must be about 95° C to insure a proper reaction. The principal reactions believed to occur are as follows:

$$3Ca(OH)_2 + 12S° \rightarrow 2CaS_5 + CaS_2O_3 + 3H_2O$$

$$PbSO_4 + CaS_5 + 2H_2O \rightarrow PbS + CaSO_4.2H_2O + 4S°$$

The purification of the leach solution is effected by addition of sulfuric acid to a pH of about 2.0 to precipitate gypsum and sulfur according to the following reactions:

$$CaS_5 + H_2SO_4 + 2H_2O \rightarrow CaSO_4.2H_2O + H_2S + 4S°$$

$$CaS_2O_3 + H_2SO_4 + H_2O \rightarrow CaSO_4.2H_2O + S° + SO_2$$

Should thiosulfate levels within the leach liquor become unacceptably high, the thiosulfate can be converted to gypsum and sulfur using pressure oxidation with oxygen.

The residue remaining from the oxygen and lime leaches is then treated with ferric chloride and calcium chloride to dissolve lead and silver contained therein according to the following reactions:

$$PbS + 2FeCl_3 \rightarrow PbCl_2 + 2FeCl_2 + S°$$

$$PbSO_4 + CaCl_2 + 2H_2O \rightarrow PbCl_2 + CaSO_4.2H_2O$$

$$Ag_2S + 2FeCl_3 \rightarrow 2AgCl + 2FeCl_2 + S°$$

In this leach it has been determined that it is necessary to maintain the system at a pH below about 1.5. Suitable quantities of any acidic material such as hydrochloric acid may be added to attain this condition. Insufficient acidity results in the hydrolysis of ferric ion which, in turn, reduces the filterability of the residue and decreases silver recovery. The temperature at which this leach is performed is preferably in the range of about 70° to 90° C. Additionally, separation of the leach solution from the resulting residue should be conducted at temperatures above that at which lead chloride will crystallize.

Silver is preferably recovered from the resulting leach liquor by cementation on lead according to the reaction:

$$2AgCl + Pb° \rightarrow PbCl_2 + 2Ag$$

Prior to cementation any ferric iron is reduced using stoichiometric quantities of lead powder. Additionally, such a process will recover a portion of copper not recovered during the oxygen leach.

The low silver loadings in solution generally necessitate the use of an extremely fine lead powder to effect cementation. It is preferred to employ an excess of lead in the cementation process. A lead silver weight ratio of about 5:1 generally provides a slight excess over stoichiometric requirements for both copper and silver. Temperature is held at about 80° C which is sufficient to maintain lead solubility during cementation.

Alternatively, silver may be recovered by chemical precipitation with hydrogen sulfide produced during the earlier mentioned acidification of lime leach liquors.

Lead is recovered from the leach liquor by crystallization of lead chloride and subsequent electrolysis. Crystallization of lead chloride occurs at solution temperatures of about 30° C. It is preferred to perform the crystallization after silver recovery to avoid losing silver during the crystallization.

The lead chloride is then fed to an electrolysis cell along with a suitable electrolyte wherein it is reduced to elemental lead.

Chlorine produced in the electrolysis of lead chloride is used to regenerate ferric chloride for recycle to the leach.

$$2\ FeCl_2 + Cl_2 \rightarrow 2\ FeCl_3$$

Iron and zinc loadings in the leach solution are controlled by a small bleed from the circuit. Hydrogen sulfide from the acidification step is employed with lime addition to remove a lead precipitate for recycle to the brine leach and a zinc-iron precipitate for recycle to the autoclave leach. The stripped solution is returned to the circuit as residue wash solution.

The use of the hydrogen sulfide generated in the acidification step and the chlorine generated in the fused salt electrolysis provides a self-sustaining regeneration system, protects the environment adjacent the plant, and reduces operating costs.

The following examples are presented to further describe and illustrate the process of this invention.

EXAMPLE I

A series of tests were performed wherein the pressure and time of the oxygen leach were varied in order to determine optimum conditions for the extraction of copper and zinc from a low grade lead concentrate. Each test utilized 250 grams of concentrate and 500 milliliters of a leach solution containing 200 grams/liter of sulfuric acid and 148 grams/liter of zinc sulfate. The leach was conducted at 100° C in a stirred Parr autoclave. The results of these tests are summarized in Table I.

TABLE I

| | Conditions | | Autoclave Leach Results % Extraction | | | | Pb Conversion |
|---|---|---|---|---|---|---|---|
| Test No. | Time (hrs.) | Oxygen Pressure (psig) | Pb | Ag | Cu | Zn | Fe to PbSO$_4$ |
| 157 | 1 | 40 | 0.02 | 0.10 | 43.3 | 76.0 | 10.8 | 82.0% |
| 153 | 2 | 40 | 0.02 | 0.11 | 85.6 | 91.3 | 16.7 | 72.3 |
| 155 | 4 | 40 | 0.02 | 0.16 | 85.9 | 94.1 | 19.7 | 77.6 |
| 166 | 7 | 40 | 0.3 | 0.10 | 89.2 | 97.3 | — | 88.7 |
| 160 | 1 | 80 | 0.02 | 0.10 | 87.8 | 87.1 | 18.2 | 70.7 |
| 159 | 2 | 80 | 0.02 | 0.10 | 90.9 | 92.2 | 21.3 | 75.2 |
| 162 | 4 | 80 | 0.02 | 0.10 | 95.7 | 97.7 | 24.3 | 80.0 |
| 163 | 7 | 80 | 0.02 | — | 96.2 | 98.0 | — | 81.8 |
| 125 | 2 | 40 | — | — | 86.1 | 91.3 | — | — |
| 127 | 2 | 50 | 0.02 | 0.12 | 91.9 | 92.6 | — | 57.2 |
| 128 | 4 | 50 | 0.02 | 0.11 | 97.2 | 98.6 | — | 65.6 |
| 137 | 2 | 40 | 0.03 | 0.15 | 93.2 | 95.7 | — | 74.8 |

A further series of tests were performed using a lead concentrate containing by weight 12.33% lead, 118 ounces per ton of silver, 4.33% copper and 14.04% zinc. The leach solution contained 200 grams/liter of sulfuric acid and 148 grams/liter of zinc sulfate. Pressure during the extraction was maintained at 40 psig (oxygen) and the temperature was 100° C. The results of these tests are summarized in Table II.

TABLE II

| Test No. | Weight Conc. | Amount Leach Solution | Leaching Time (hrs.) | Free Acid Equiv. in Pregnant Solution Grams/Liter | % Extraction | | | | % Pb Conversion to PbSO$_4$ |
|---|---|---|---|---|---|---|---|---|---|
| | | | | | Pb | Ag | Cu | Zn | |
| 109A | 250 g | 1000 ml. | 4 | 123 | 0.02 | 0.05 | 98.8 | 99.1 | 83.8 |
| 110A | 500 g | 1000 ml. | 4 | 60 | 0.02 | 0.01 | 96.5 | 98.2 | 85.8 |
| 111A | 500 g | 1000 ml. | 2 | 60 | 0.02 | 0.01 | 93.3 | 95.1 | 70.2 |
| 112A | 500 g | 1000 ml. | 1 | 60 | 0.04 | 1.33 | 93.6 | 93.5 | 62.0 |
| 113A | 750 g | 1000 ml. | 3 | 12 | 0.02 | 1.21 | 53.9 | 85.1 | 55.5 |

EXAMPLE II

Low grade lead concentrate containing by weight approximately 8% copper, 8% zinc, 12% lead, 6% water and 130 ounces of silver per ton, is admixed with spent zinc electrolyte (210 grams/liter of sulfuric acid; 48 grams/liter zinc) and 150 parts per million chloride ion in an autoclave. The concentrate is leached for 2 hours at an oxygen pressure of 60 psig and a temperature of 100° C.

As a result of this leach, the feed concentrate is extracted of 98% of its original copper and zinc concentrations. 92% of the lead sulfide contained in the concentrate is converted to lead sulfate.

To the concentrate residue resulting from the above oxygen leach is added lime in an amount 10% greater than required according to the following stoichiometric equation:

$$3Ca(OH)_2 + 12S° \rightarrow 2CaS_5 + CaS_2O_3 + 3H_2O$$

Additionally, there is added sulfide ions (CaS$_5$) by recycling the product stream produced in the above reaction. The concentrate is leached for 90 minutes at 95° C resulting in the removal of 98% of the original elemental sulfur content and conversion of 82% of the lead sulfate to lead sulfide.

The resulting concentrate residue is then leached with ferric chloride and calcium chloride at a pH of 1.0 and a temperature of 80° C for 90 minutes. The foregoing resulted in the extraction of 99% of the lead content of the residue, 20% of residual copper, 40% of residual zinc, and 98% of the original silver content.

The leach liquor resulting from the above-described lime leach is acidified with sulfuric acid to a pH of 2.0 and reacted at 90° C for 1 hour to precipitate gypsum and sulfur.

Silver is recovered from the final leach liquor by cementation on very fine lead powder at 80° C for 30 minutes, the following principal reactions taking place:

$$2FeCl_3 + Pb° \rightarrow FeCl_2 + PbCl_2$$

$$2AgCl + Pb° \rightarrow PbCl_2 + 2Ag$$

$$CuCl_2 + Pb° \rightarrow PbCl_2 + Cu°$$

The substantially silver-free liquor is then treated to recover lead therefrom by cooling to below about 30° C to crystallize lead chloride. An electrolyte solution is then prepared containing by weight 50% lead chloride, 25.5% lithium chloride, 21.7% potassium chloride and 2.8% calcium chloride. Electrolysis is conducted at 425° C, a current density of 700–1000 amperes/square foot, and an electrode spacing of 3 centimeters (resistivity 0.5 ohm-centimeters).

A combination of laboratory and pilot plant tests were conducted as indicated below to explore and define the process parameters of the present invention.

1. AUTOCLAVE LEACH a. LABORATORY

*Effect of Time*

Head: 8.48% copper, 7.12% zinc, 26.85% iron (by weight)

Charge: 200 grams of lead concentrate
   0.75 liters of zinc plant spent electrolyte:
      48 grams/liter of zinc
      158 grams/liter of sulfuric acid
      approximately 250 parts per million chloride Conditions: 60 psig oxygen pressure
   100° C temperature Results:

| Test | Time Hrs. | Percent Extraction Copper | Zinc | Iron | Percent Lead Sulfation | Potential Millivolts | End Acid Grams/Liter |
|---|---|---|---|---|---|---|---|
| A1 | 0* | 16.2 | 25.3 | 6.1 | 46.2 | 615 | 132 |
| A2 | 0.25 | 47.1 | 59.4 | 16.4 | 57.4 | 655 | 94 |
| A3 | 0.50 | 67.7 | 81.9 | 22.6 | 65.3 | 667 | 66 |
| A4 | 1.0 | 94.2 | 95.1 | 30.6 | 65.9 | 710 | 40 |
| A5 | 2.0 | 99.3 | 98.8 | 35.4 | 89.5 | 716 | 30 |
| A6 | 4.0 | 98.8 | 99.3 | 39.2 | 91.0 | 724 | 14 |
| A7 | 8.0 | 99.2 | 99.4 | 51.3 | 93.1 | 722 | 33 |
| A8 | 16.0 | 99.4 | 99.4 | 76.4 | 98.6 | 742 | 38 |

*0 time denotes that the autoclave had reached operating temperature.

b. PILOT PLANT

Pilot Plant tests were performed continuously in a three compartment horizontal autoclave of 680 liter capacity. Operation was carried out three shifts per day, five days per week. Samples were cut routinely at one hour intervals and composited daily for assay.

Leaches were performed using synthetic spent electrolyte prepared by diluting Zinc Plant neutral solution with water. Hydrochloric acid and 93% sulfuric acid were added to achieve the required concentrations of chloride and acid.

| Head: ASSAYS (% by weight) | Effect of Pressure SERIES 1 | SERIES 2 |
|---|---|---|
| copper | 10.07 | 7.64 |
| zinc | 8.31 | 8.82 |
| lead | 13.85 | 15.48 |
| iron | 27.68 | 24.75 |

Conditions: 4 hours nominal retention time
   101° C temperature
   147 grams/liter of sulfuric acid Results:

| PRESSURE psig | PERCENT EXTRACTION COPPER | ZINC | IRON | PERCENT LEAD SULFATION | END ACID GRAMS/LITER | PARTS PER MILLION CHLORIDE START | END |
|---|---|---|---|---|---|---|---|
| Series 1 | | | | | | | |
| 50 | 95.5 | 96.0 | 37.2 | 85.1 | 34.0 | 325 | 133 |
| 60 | 96 | 98 | 36.1 | 86.0 | 40.0 | 293 | 103 |
| 70 | 96.7 | 98.4 | 38.7 | 78.8 | 28.5 | 252 | 34 |
| 80 | 96.5 | 98.2 | 38.1 | 85.1 | 42.0 | 333 | 117 |
| Series 2 | | | | | | | |
| 60 | 94.8 | 96.9 | 33.3 | 87.7 | 34.8 | 341 | 119 |
| 70 | 96.9 | 98.3 | 34.1 | 88.8 | 40.0 | 369 | 133 |
| 80 | 96.4 | 97.4 | 27.0 | 88.1 | 42.0 | 342 | 105 |
| 90 | 96.2 | 97.1 | 28.0 | 84.1 | 44.0 | 351 | 113 |

| Head: ASSAYS (% by weight) | Effect of Retention Time SERIES 1 | SERIES 2 | SERIES 3 |
|---|---|---|---|
| copper | 9.71 | 8.57 | 7.94 |
| zinc | 7.93 | 9.19 | 7.72 |
| lead | 13.52 | 13.18 | 13.23 |
| iron | 25.91 | 26.28 | 25.7 |

Conditions: 60 psig oxygen pressure
   100° C temperature
   147 grams/liter of sulfuric acid Results:

| RETENTION TIME (HOURS) | PERCENT EXTRACTIONS COPPER | ZINC | IRON | PERCENT LEAD SULFATION | END ACID GRAMS/LITER | PARTS PER MILLION CHLORIDE START | END |
|---|---|---|---|---|---|---|---|
| Series 1 | | | | | | | |

-continued

| RETENTION TIME (HOURS) | PERCENT EXTRACTIONS | | | PERCENT LEAD SULFATION | END ACID GRAMS/LITER | PARTS PER MILLION CHLORIDE | |
|---|---|---|---|---|---|---|---|
| | COPPER | ZINC | IRON | | | START | END |
| 4 | 96.9 | 98.2 | 41.6 | 90.2 | 50.6 | 321 | 37 |
| 4.5 | 96.9 | 98.7 | 39.1 | 91.2 | 50.8 | 299 | 103 |
| 5.0 | 97.0 | 97.5 | 45.2 | 93.7 | 44.0 | 310 | 115 |
| 5.5 | 97.4 | 98.6 | 44.0 | 85.4 | 32.0 | 312 | 131 |
| 6.0 | 97.4 | 98.8 | 40.7 | 91.0 | 36.0 | 318 | 122 |
| Series 2 | | | | | | | |
| 4 | 96.2 | 96.7 | 35.3 | 78.0 | 34.0 | 511 | 444 |
| 5 | 96.7 | 98.0 | 40.7 | 86.4 | 40.0 | 334 | 133 |
| 6 | 97.1 | 97.8 | 39.6 | 87.6 | 46.8 | 344 | 190 |
| Series 3 | | | | | | | |
| 4 | 96.3 | 97.4 | 38.6 | 89.4 | 54.0 | 342 | 110 |
| 5 | 97.1 | 98.3 | 43.9 | 84.7 | 40.0 | 291 | 131 |
| 6 | 96.7 | 97.8 | 37.1 | 87.9 | 43.2 | 257 | 132 |

*Effect of Temperature*
Head: 8.18% copper, 9.44% zinc, 13.83% lead, 23.53% iron (by weight)
Conditions: 4 hours nominal retention time
60 psig oxygen pressure
147 grams/liter of sulfuric acid
Results:

2. LIME LEACH

*Effect of Recycled Solution*
Head: 40.95% sulfur, 17.36% lead, 15.68% lead as sulfate (by weight)
Charge: 125 grams of autoclave residue
0.6 liters of water

| TEMPERATURE °C | PERCENT EXTRACTION | | | PERCENT LEAD SULFATION | END ACID GRAMS/LITER | PART PER MILLION CHLORIDE | |
|---|---|---|---|---|---|---|---|
| | COPPER | ZINC | IRON | | | START | END |
| 95 | 94.6 | 96.5 | 38.8 | 79.7 | 46.0 | 312 | 137 |
| 100 | 95.2 | 95.4 | 38.8 | 87.3 | 37.6 | 371 | 142 |
| 105 | 96.6 | 96.9 | 44.3 | 87.7 | 39.0 | 367 | 151 |
| 110 | 97.2 | 97.1 | 41.0 | 80.4 | 38.8 | 312 | 119 |

*Effect of Chloride Concentration*
Head: 5.79% copper, 7.39% zinc 15 grams of lime
Results:

| TEMPERATURE °C | No Recycled Solution 95 | | | BOILING | | |
|---|---|---|---|---|---|---|
| TIME (HOURS) | 2 HOURS | 4 HOURS | 6 HOURS | 2 HOURS | 4 HOURS | 6 HOURS |
| Sulfur Extraction Percent | 2.3 | 3.2 | 4.5 | 18.1 | 3.1 | 15.3 |
| Lead Sulfate Reconversion Percent | .7 | 4.3 | 15.1 | 11 | 12.2 | 4.2 |

| TEMPERATURE °C | | With Recycled Solution RECYCLE VOLUME (Milliliters) | | | | |
|---|---|---|---|---|---|---|
| | | 0 | 25 | 50 | 75 | 100 |
| 90 | Sulfur Extraction Percent | 3.6 | 4.5 | .8 | 21 | 22.9 |
| | Lead Sulfate Reconversion Percent | 38 | 40 | 49 | 76 | 76 |
| 95 | Sulfur Extraction Percent | 19 | 19.6 | 18.9 | 23 | 24.1 |
| | Lead Sulfate Reconversion Percent | 78 | 79 | 77 | 77 | 78 |

NOTE:
Sulfur extractions only were monitored during the leach. Twenty-four percent sulfur extraction from this sample represents an elemental sulfur extraction of approximately 98 percent.

14.88% lead, 26.8% iron (by weight)
Conditions: 5 hours nominal retention time
70 psig oxygen pressure
110° C temperature
194 grams/liter of sulfuric acid
Results:

*Effect of Retention Time*
Head: 39.02% sulfur, 11.8% elemental sulfur, 15.8% lead, 14.8% lead as sulfate (by weight)
Charge: 1000 grams of autoclave leach residue

| PARTS PER MILLION CHLORIDE | | PERCENT EXTRACTION | | | PERCENT LEAD SULFATION | END ACID GRAMS/LITER |
|---|---|---|---|---|---|---|
| START | END | COPPER | ZINC | IRON | | |
| 5* | 3 | 79.0 | 96.7 | 29.2 | 77.7 | 64.0 |
| 112 | 40 | 97.0 | 98.0 | 23.3 | 89.5 | 54.0 |
| 309 | 71 | 97.9 | 98.6 | 26.6 | 95.4 | 40.0 |
| 1000 | 421 | 95.6 | 97.5 | 31.9 | 84.4 | 50.0 |

*water and acid only lime 0.4 liters of recycle (22.0 grams/liter sulfur)
Condition: 95° C temperature
Results:

A. 144 Grams lime (120 percent stoichiometric)

| TIME | RESIDUE ASSAY PERCENT | | PERCENT SULFUR EXTRACTION | | PERCENT LEAD SULFATE |
|---|---|---|---|---|---|
| HOURS | TOTAL SULFUR | ELEMENTAL SULFUR | TOTAL | ELEMENTAL | RECONVERSIONS |
| 0 | 39.02 | 11.8 | — | — | — |
| .25 | 33.12 | 3.6 | 15.1 | 70.7 | 61.7 |
| .50 | 33.06 | .38 | 15.3 | 96.9 | 72.6 |
| .75 | 32.12 | .45 | 17.7 | 96.3 | 72.7 |
| 1.0 | 32.43 | .10 | 16.9 | 99.2 | 74.0 |
| 2.0 | 32.67 | .25 | 16.3 | 98.0 | 71.9 |
| 3.0 | 33.06 | .14 | 15.3 | 98.9 | 72.2 |
| 4.0 | 32.37 | .14 | 17.0 | 98.9 | 72.2 |
| 5.0 | 31.80 | .10 | 18.5 | 99.2 | 70.9 |

B. 160 Grams lime (133 percent stoichiometric)

| TIME | RESIDUE ASSAY PERCENT | | PERCENT SULFUR EXTRACTION | | PERCENT LEAD SULFATE |
|---|---|---|---|---|---|
| HOURS | TOTAL SULFUR | ELEMENTAL SULFUR | TOTAL | ELEMENTAL | RECONVERSIONS |
| 0 | 39.02 | 11.8 | — | — | — |
| .25 | 34.70 | .11 | 11.1 | — | 71.6 |
| .50 | 33.0 | .35 | 15.4 | 97.2 | 76.0 |
| .75 | 32.65 | .16 | 16.3 | 98.7 | 74.8 |
| 1.0 | 32.51 | .28 | 16.7 | 97.2 | 73.0 |
| 2.0 | 32.36 | .31 | 17.1 | 97.5 | 73.4 |
| 3.0 | 32.18 | .28 | 17.5 | 97.7 | 73.2 |
| 4.0 | 32.18 | .1 | 17.5 | 99.2 | 70.8 |
| 5.0 | 31.63 | .1 | 18.9 | 99.2 | 64.7 |

3. LIME LEACH PURIFICATION

A. Acidification

Head Solution: 11.96 Grams/Liter of calcium, 27.55 Grams/Liter of sulfur

Charge: 0.5 Liters of solution
10.0 milliliters of 96 percent sulfuric acid

Results:

| TEST | TEMPERATURE °C | TIME HOURS | PERCENT UNEXTRACTED MATERIAL | | |
|---|---|---|---|---|---|
| | | | CALCIUM | TOTAL SULFUR | NON-SULFATE SULFUR |
| A1 | 23 | 1 | 11.2 | 49.7 | 35.4 |
| A2 | 23 | 4 | 9.2 | 56.9 | 40.2 |
| B1 | 70 | 1 | 7.2 | 28.0 | 18.4 |
| B2 | 70 | 4 | 6.9 | 27.8 | 19.8 |
| C1 | 90 | 1 | 8.1 | 28.2 | 17.5 |
| C2 | 90 | 4 | 6.9 | 26.7 | 16.3 |

B. Pressure Oxidation

Head Solution: 12.9 Grams/Liter of calcium, 26.75 Grams/Liter of sulfur

Charge: 0.4 Liters of solution

Conditions: 90 psig oxygen pressure
1 hour retention time

Results:

| TEST | TEMPERATURE C | FINAL pH | PERCENT UNEXTRACTED MATERIAL | |
|---|---|---|---|---|
| | | | CALCIUM | SULFUR |
| A | 110 | 3.6 | 96.1 | 65.0 |
| B | 115 | 3.5 | 72.1 | 59.9 |
| C | 120 | 3.4 | 47.7 | 37.8 |
| D | 125 | 3.0 | 17.4 | 16.2 |
| E | 130 | 2.4 | 8.9 | 9.2 |

Head Solution: 11.6 Grams/Liter of calcium, 23.4 Grams/Liter of sulfur

Charge: 0.4 Liters of solution

Conditions: 135° C temperature 90 psig oxygen pressure

Results:

| TEST | TIME HOURS | FINAL pH | PERCENT UNEXTRACTED MATERIAL | |
|---|---|---|---|---|
| | | | CALCIUM | SULFUR |
| A | 0.25 | 3.6 | 75.6 | 44.6 |
| B | 0.50 | 2.9 | 21.1 | 18.0 |
| C | 1.0 | 2.4 | 10.8 | 8.4 |
| D | 2.0 | 1.7 | 6.7 | 6.7 |

4. BRINE LEACH

Metal Extractions with Time And Temperature —
Head: 0.21% copper, 0.17% zinc, 16.2% lead, (by weight), 66.77 ounces per ton of silver Charge: 95 grams of lime leach residue
0.65 liters of leach solution (35 Grams/Liter of ferric chloride, 3 Grams/Liter of ferrous chloride, 42 Grams/Liter of zinc chloride, pH 1.5)

Results:

| TEST | TEMPERATURE °C | TIME HOURS | FINAL pH | PERCENT EXTRACTION | | | |
|---|---|---|---|---|---|---|---|
| | | | | COPPER | LEAD | ZINC | SILVER |
| A1 | 70 | 0.5 | 1.5 | 16.7 | 98.9 | 31.2 | 96.2 |
| A2 | 70 | 1.0 | 1.5 | 17.6 | 98.9 | 31.2 | 95.9 |
| A3 | 70 | 1.5 | 1.5 | 17.6 | 99.1 | 37.5 | 96.1 |
| B1 | 80 | 0.5 | 1.3 | 25.0 | 99.3 | 37.5 | 96.0 |
| B2 | 80 | 1.0 | 1.3 | 22.2 | 99.1 | 35.0 | 95.2 |
| B3 | 80 | 1.5 | 1.4 | 22.2 | 99.1 | 29.3 | 96.0 |
| C1 | 90 | 0.5 | 1.2 | 33.3 | 99.3 | 37.5 | 96.1 |

-continued

| TEST | TEMPERATURE °C | TIME HOURS | FINAL pH | PERCENT EXTRACTION | | | |
|------|----------------|------------|----------|--------|------|------|--------|
|      |                |            |          | COPPER | LEAD | ZINC | SILVER |
| C2   | 90             | 1.0        | 1.3      | 27.7   | 99.3 | 39.8 | 96.0   |
| C3   | 90             | 1.5        | 1.2      | 35.3   | 99.3 | 41.8 | 96.2   |
| D1   | 70             | 1.5        | 1.0      | 21.1   | 99.3 | 31.2 | 95.8   |
| D2   | 80             | 1.5        | 1.4      | 12.5   | 99.2 | 43.7 | 96.8   |
| D3   | 90             | 1.5        | —        | 47.4   | 99.3 | 43.7 | 97.0   |

Head for B2, B3 and C2, C3 — 0.20% copper, 0.19% zinc, 16.6% lead (by weight), 61.14 ounces per ton silver.

*Ferric Chloride Levels —*
Head: 0.46% copper, 0.25% zinc, 17.96% lead (by weight), 84.09 ounces per ton of silver
Charge: 95 grams of lime leach residue
  0.65 liters of leach solution
Conditions: 80° C temperature
  1 hour retention time
Results:

| TEST | FERRIC CHLORIDE CONC. GRAM/LITER | LEACH END POTENTIAL MILLIVOLTS | PERCENT EXTRACTION | | | |
|------|--------|--------|--------|------|------|--------|
|      |        |        | COPPER | LEAD | ZINC | SILVER |
| A    | 20     | 203    | 2.1    | 93.9 | 19.8 | 7.6    |
| B    | 30     | 252    | 2.1    | 98.1 | 23.1 | 26.0   |
| C    | 40     | 470    | 13.6   | 98.9 | 30.5 | 96.2   |
| D    | 50     | 652    | 19.6   | 99.3 | 39.0 | 96.8   |

5. FERROUS CHLORIDE OXIDATION

Head: 40 Grams/Liter of ferrous chloride, 400 Grams/Liter of calcium chloride, pH 1.5
Apparatus: 50 millimeter ID column, packed with 8 millimeter O.D. Raschig rings
Conditions: 60° C temperature, 0.18 liters per minute liquid flow
Results:

| COLUMN HEIGHT METERS | LIQUID RETENTION TIME sec. | CHLORINE FLOW MILLILITER/MIN. | PERCENT CHLORINE | SOLUTION POTENTIAL MILLIVOLTS | PERCENT CHLORINE UTILIZATION |
|------|------|------|-----|-----|------|
| 0.61 | 17   | 550* | 100 | 726 | 74.4 |
| 0.61 | 17   | 550  | 94  | 726 | 74.4 |
| 0.61 | 17   | 550  | 68  | 721 | 69.2 |
| 0.61 | 17   | 550  | 42  | 714 | 61.3 |
| 1.22 | 46   | 550  | 100 | 743 | 91.8 |
| 1.22 | 46   | 550  | 94  | 742 | 90.8 |
| 1.22 | 46   | 550  | 68  | 738 | 87.4 |
| 1.22 | 46   | 550  | 42  | 734 | 83.3 |
| 1.52 | 60.5 | 550  | 100 | 758 |      |
| 1.52 | 60.5 | 550  | 94  | 751 | 98.7 |
| 1.52 | 60.5 | 550  | 68  | 743 | 91.8 |
| 1.52 | 60.5 | 550  | 42  | 741 | 89.8 |
| 1.95 | 82.5 | 550  | 100 | 753 | 100  |
| 1.95 | 82.5 | 550  | 94  | 754 |      |
| 1.95 | 82.5 | 550  | 68  | 756 |      |
| 1.95 | 82.5 | 550  | 42  | 745 | 93.5 |
| 1.83 | 75   | 600**| 100 | 764 | 98.3 |
| 1.83 | 75   | 600  | 70  | 757 | 94.2 |
| 1.83 | 75   | 600  | 44  | 742 | 83.2 |

*80% oxidation at 100 percent chlorine utilization
**87% oxidation at 100 percent chlorine utilization

6. TREATMENT OF BRINE LEACH BLEED STREAM

Head Solution: 48.0 grams/liter of lead, 21.0 grams/liter of zinc, 16.1 grams/liter of iron
Charge: 1.5 liters of solution, reagent grade hydrogen sulfide (160 milliliters per minute), lime as required to maintain pH
Conditions: 70° C temperature, pH 3.0
Results:

| SEQUENTIAL PRODUCTS | LIME ADDITION GRAMS | PERCENT RECOVERY | | |
|---|---|---|---|---|
|   |   | LEAD | ZINC | IRON |
| Lead Precipitate | 25.8 | 93.1 | 1.0 | 1.7 |
| Zinc Precipitate | 33.2 | 6.5 | 86.9 | 8.9 |
| Recycle Solution |      | 0.4 | 12.1 | 89.4 |

7. FUSED SALT ELECTROLYSIS

*FIVE TESTS (AVERAGED)*
Electrolyte: 25.5% (by weight) lithium chloride
  2.8% calcium chloride
  21.7% potassium chloride
  50.0% lead chloride
Conditions: 425° C temperature
  3 centimeter electrode spacing
Results: electrolyte melting point: approximately 340° C
  electrolyte resistivity: 0.5 ohm-centimeters at 425° C
  decomposition voltage for lead chloride: 1.35 volts
Current Efficiency: 99.1% at 0.80 amps per square centimeter current density
  99.2% at 0.43 amps per square centimeter current density
  99.5% at 0.43 amps per square centimeter current density

8. EFFECT OF LIME LEACH ON SILVER EXTRACTIONS

Head Sample: A1 — 6.21% copper (by weight), 9.2% lead, 6.55% zinc, 126.6 ounces per ton silver
Head Sample: A2 — 6.75% copper (by weight), 9.96% lead, 7.10% zinc, 127.6 ounces per ton silver
Charge:
  autoclave leach: 188 grams of concentrate 0.75 liters of spent electrolyte (153 grams/liter of sulfuric acid, 40 grams/liter of zinc)
lime leach: 124.4 grams of concentrate
  18 grams lime
  60 milliliters of recycle solution
  150 milliliters of water
brine leach: 90 grams solids (A1), 100 grams (A2)
  0.65 liters of leach solution (42 grams/liter of ferric chloride, 400 grams/liter of calcium chloride)

Conditions:
  autoclave leach: 100° C, 60 psig, 2 hours
  lime leach: 95° C, 1.5 hours
  brine leach: 80° C, 1 hour Results:

| TEST | PERCENT UNIT EXTRACTION | | | | |
|---|---|---|---|---|---|
| | COPPER | ZINC | ELEMENTAL SULFUR | LEAD | SILVER |
| A1 - Lime Leach | | | | | |
| Autoclave Leach | 97.1 | 96.7 | | | |
| Lime Leach | | | 97.9 | | |
| Brine Leach | 37.5 | 69.0 | | 99.2 | 98.1 |
| A-2 - No Lime Leach | | | | | |
| Autoclave Leach | 95.4 | 95.3 | | | |
| Brine Leach | 16.1 | 50.6 | | 97.7 | 89.1 |

As will be apparent to those skilled in this art, the process of this invention may be applied to the recovery of metals from a variety of metallurgical products such as smelter dusts, metal drosses, middling concentrates from flotation processing, and other like sources of lead, zinc, copper and zinc metals. Further, in the treatment of mineral concentrates, the valueless and sulfur-rich mineral pyrite ($FeS_2$) remains substantially unattacked at all stages of leaching.

What is claimed is:

1. A process for treating sulfide concentrates containing lead, copper, zinc and silver to selectively recover said metals therefrom, comprising the steps of:
   a. contacting said concentrate with sulfuric acid in the presence of oxygen at elevated temperature and pressure to extract copper and zinc materials from said concentrate;
   b. thereafter contacting said concentrate with lime to remove elemental sulfur therefrom; and
   c. thereafter by contacting said concentrate with a mixture of calcium chloride and ferric chloride to extract lead and silver materials therefrom.

2. The process of claim 1 wherein said extraction of copper and zinc is conducted at an oxygen pressure in the range of about 60 to about 80 psig and a temperature of at least about 100° C.

3. The process of claim 1 wherein said contacting with lime is conducted at a temperature of about 95° C.

4. The process of claim 3 wherein said contacting with lime is conducted in the presence of sulfide ions.

5. The process of claim 1 wherein said extraction of lead and silver is conducted at a pH of less than about 1.5.

6. The process of claim 1 further comprising treating the extracted copper and zinc materials to recover metallic copper and zinc therefrom.

7. The process of claim 6 wherein the treatment of said extracted copper material to recover metallic copper comprises contacting said copper materials with finely-divided zinc metal to cement copper metal on said zinc.

8. The process of claim 6 wherein the treatment of said zinc material to recover metallic zinc therefrom comprises electrolytically reducing zinc contained in said materials to its elemental state.

9. The process of claim 1 further comprising treating the extracted lead and silver materials to recover metallic lead and silver.

10. The process of claim 9 wherein said treatment of extracted silver materials to recover metallic silver therefrom comprises contacting said silver materials with finely-divided metallic lead to cement silver metal on said lead.

11. The process of claim 9 wherein said treatment of extracted lead material to recover metallic lead therefrom comprises recovering lead chloride and thereafter electrolytically reducing lead chloride in a fused chloride salt electrolyte to produce lead metal and chlorine gas for the regeneration of ferric chloride.

12. A process for treating sulfide concentrates containing lead, copper, zinc and silver to selectively recover said metals therefrom, comprising the steps of:
   a. contacting said concentrate with sulfuric acid in the presence of oxygen at a pressure of about 60 to 80 psi and a temperature of at least about 100° C;
   b. dividing the concentrate treated in a) into a first residue fraction and a first supernatant fraction;
   c. treating said first supernatant fraction to recover metallic copper and zinc therefrom;
   d. contacting said first residue fraction with lime at a temperature of about 95° C;
   e. dividing the material resulting from (d) into a second residue fraction and a second supernatant fraction;
   f. treating said second supernatant fraction to remove elemental sulfur therefrom;
   g. contacting said second residue fraction with a mixture of ferric chloride and calcium chloride and removing a third supernatant fraction from the material resulting from said contacting; and
   h. treating said third supernatant to recover metallic lead and silver therefrom.

13. A process for treating sulfide concentrates containing lead, copper, zinc and silver to selectively recover said metals therefrom, and in which the gangue mineral pyrite remains substantially inert at all stages of the process, comprising the steps of:
   a. contacting said concentrate with sulfuric acid in the presence of oxygen at elevated temperature and pressure to extract copper and zinc materials from said concentrate;
   b. thereafter contacting said concentrate with lime to remove elemental sulfur therefrom; and
   c. thereafter by contacting said concentrate with a mixture of calcium chloride and ferric chloride to extract lead and silver materials therefrom.

14. A process for treating sulfide concentrates containing lead, copper, zinc and silver to selectively recover said metals therefrom, and in which the gangue mineral pyrite remains substantially inert at all stages of the process, comprising the steps of:
   a. contacting said concentrate with sulfuric acid in the presence of oxygen at elevated temperature and pressure to extract copper and zinc materials from said concentrates;
   b. thereafter contacting said concentrate with lime and/or sulfide containing solution to remove elemental sulfur therefrom and to activate refractory silver-containing minerals in the concentrate; and
   c. thereafter by contacting said concentrate with a mixture of calcium chloride and ferric chloride to extract lead and silver materials therefrom.

* * * * *

UNITED STATES PATENT AND TRADEMARK OFFICE
CERTIFICATE OF CORRECTION

PATENT NO. : 4,063,933

DATED : December 20, 1977

INVENTOR(S) : Ernest Peters

It is certified that error appears in the above-identified patent and that said Letters Patent are hereby corrected as shown below:

Column 8, Effect of Retention Time - Series 2, 4th line (line 58 approximately) "26.28" should be --26.23--.

Signed and Sealed this

First Day of August 1978

[SEAL]

Attest:

RUTH C. MASON
Attesting Officer

DONALD W. BANNER
Commissioner of Patents and Trademarks